(12) United States Patent
Gotou

(10) Patent No.: US 9,694,499 B2
(45) Date of Patent: Jul. 4, 2017

(54) ARTICLE PICKUP APPARATUS FOR PICKING UP RANDOMLY PILED ARTICLES

(71) Applicant: FANUC CORPORATION, Minamitsuru-gun, Yamanashi (JP)

(72) Inventor: Takefumi Gotou, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/851,476

(22) Filed: Sep. 11, 2015

(65) Prior Publication Data

US 2016/0075031 A1    Mar. 17, 2016

(30) Foreign Application Priority Data

Sep. 16, 2014    (JP) .................................. 2014-188050

(51) Int. Cl.
*B25J 9/16*    (2006.01)
*G01B 11/00*    (2006.01)

(52) U.S. Cl.
CPC ............. *B25J 9/1697* (2013.01); *G01B 11/00* (2013.01); *G05B 2219/40053* (2013.01); *Y10S 901/09* (2013.01); *Y10S 901/34* (2013.01); *Y10S 901/46* (2013.01); *Y10S 901/47* (2013.01)

(58) Field of Classification Search
CPC . B25J 9/1697; B25J 15/00; B25J 9/042; B25J 9/1612; B25J 9/1664; B25J 15/0009; B25J 15/10; B25J 19/023; B25J 13/084; B25J 9/1656; B25J 13/08; B25J 19/021; B25J 9/1633; B25J 13/085
See application file for complete search history.

(56) References Cited

U.S. PATENT DOCUMENTS

| | | | |
|---|---|---|---|
| 2004/0140787 A1* | 7/2004 | Okamoto | B25J 13/083 318/568.21 |
| 2010/0168919 A1* | 7/2010 | Okamoto | B25J 9/1643 700/275 |
| 2012/0004774 A1* | 1/2012 | Umetsu | B25J 5/007 700/254 |
| 2012/0290133 A1* | 11/2012 | Goto | B25J 9/1612 700/258 |
| 2014/0025197 A1 | 1/2014 | Mattern et al. | |

(Continued)

FOREIGN PATENT DOCUMENTS

| | | |
|---|---|---|
| CN | 1052445 | 6/1991 |
| DE | 102010051935 | 5/2012 |

(Continued)

OTHER PUBLICATIONS

Wesley Patrick Chan; A Human-Inspired Controller for Robot-Human Object Handovers a Study of Grip and Load Forces in Handovers and the Design and Implementation of a Novel Handover Controller;The University of British Columbia, 2010.*

*Primary Examiner* — Khoi Tran
*Assistant Examiner* — Ryan Rink
(74) *Attorney, Agent, or Firm* — RatnerPrestia

(57) ABSTRACT

An article pickup apparatus according to the present invention is configured to control a robot or a hand in accordance with profile control when the hand holds an article so that an external force acting on the hand detected by a force sensor installed between an arm and the hand is closer to a target value of the external force set by a force target value setting unit.

6 Claims, 8 Drawing Sheets

(56) References Cited

U.S. PATENT DOCUMENTS

| | | | |
|---|---|---|---|
| 2014/0067126 A1* | 3/2014 | Watanabe | G06T 7/0046 |
| | | | 700/259 |
| 2014/0207275 A1 | 7/2014 | Sakano | |
| 2014/0230581 A1 | 8/2014 | Nakatani et al. | |
| 2014/0238157 A1* | 8/2014 | Sato | B25J 13/085 |
| | | | 73/865 |
| 2014/0316572 A1* | 10/2014 | Iwatake | B25J 9/1633 |
| | | | 700/258 |
| 2015/0297864 A1* | 10/2015 | Kokish | A61M 25/0113 |
| | | | 604/95.04 |

FOREIGN PATENT DOCUMENTS

| | | |
|---|---|---|
| DE | 102012012988 | 4/2014 |
| DE | 102014000638 | 7/2014 |
| JP | 05127722 | 5/1993 |
| JP | 2000-263481 A | 9/2000 |
| JP | 2007276112 | 10/2007 |
| JP | 2007313624 | 12/2007 |
| JP | 2009220248 | 10/2009 |
| JP | 2011-093058 A | 5/2011 |
| JP | 2011-179909 A | 9/2011 |
| JP | 2011230257 | 11/2011 |
| JP | 2012-137421 A | 7/2012 |
| JP | 2013043232 | 3/2013 |
| JP | 2013043256 | 3/2013 |
| JP | 2013056402 | 3/2013 |
| WO | 2012066819 | 5/2012 |

\* cited by examiner

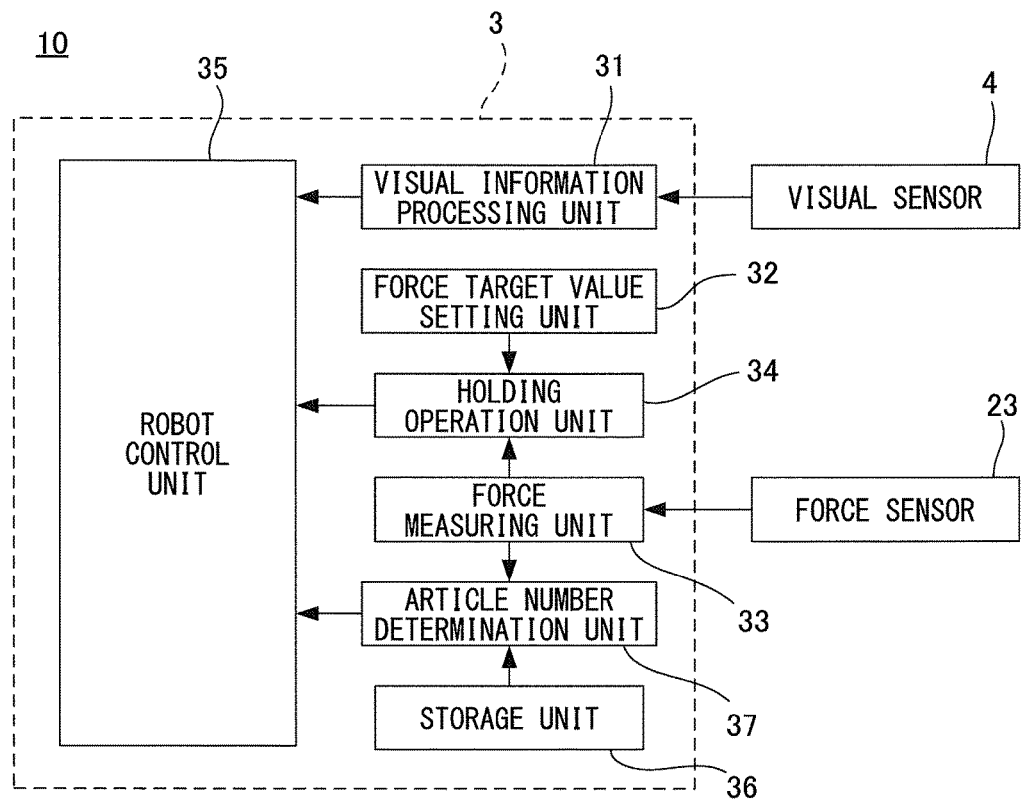
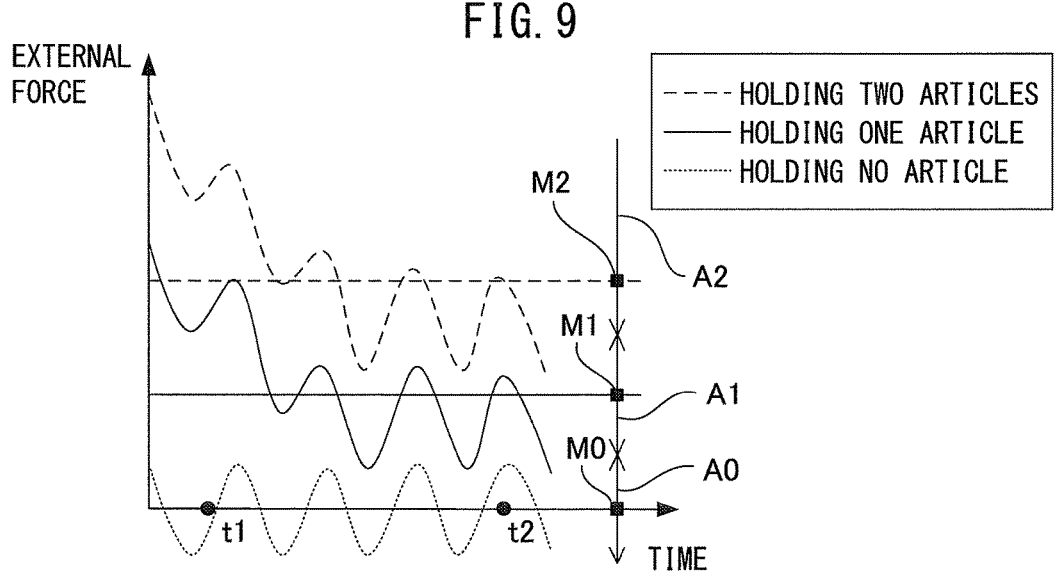

ARTICLE PICKUP APPARATUS FOR PICKING UP RANDOMLY PILED ARTICLES

BACKGROUND OF THE INVENTION

1. Technical Field

The present invention relates to an article pickup apparatus for picking up randomly piled articles by a robot.

2. Description of the Related Art

An article pickup apparatus for picking up randomly piled articles by a robot is known. The article pickup apparatus visually recognizes a loaded state of articles based on a two-dimensional image of the articles captured by a camera or a three-dimensional point set acquired using a three-dimensional measurement device (See Japanese Laid-open Patent Publications No. 2011-179909 and No. 2011-093058).

Japanese Laid-open Patent Publication No. 2011-179909 discloses a position and posture measurement apparatus which estimates a position and a posture of a target object using a distance image of the target object. The position and posture measurement apparatus according to the known technique compares information indicating a distance between an object model and an object area with information indicating a distance between a partial area, which is not set as the object area in a partial area group, and the object model, and updates the object area by adding a new partial area to the object area according to the comparison result, in order to estimate the position and the posture of the target object by associating a group of three-dimensional points of the updated object area with the object model.

Japanese Laid-open Patent Publication No. 2011-093058 discloses a technique for extracting a grip area including an object to be gripped by a grip mechanism of a robot from three-dimensional information of a supply unit on which an object whose position and posture are unknown is provided. According to the known technique, the three-dimensional information of the supply unit is generated from three-dimensional measurement data of the supply unit for an object and extracts, using a grip area stored in advance, which includes a grip portion area and a grip mechanism area, an area where the object exists in an entire grip portion area and does not exists in the grip mechanism area, as a grippable area from the three-dimensional information.

However, if a position and a posture of an article or a grip position and posture of a hand is detected based on visual information acquired using a visual sensor as in the cases of the known techniques described in Japanese Laid-open Patent Publications No. 2011-179909 and No. 2011-093058, there is always a risk of false detection, detection failure, or a detection error. For example, in the case where an article is gripped by a chuck hand including a pair of claws, when a center of the hand does not match with a center of the article, only one claw of the hand comes into contact with the article, which makes it difficult to close the hand. In this case, a gap is formed between the other claw and the article, and thus it is likely that the hand fails to hold the article. If the hand is forcibly closed, a robot or the hand is subjected to an overload, or the article may be damaged by an excess force.

Japanese Laid-open Patent Publication No. 2000-263481 discloses a technique in which a sensor for detecting an abnormal operation is installed in a manipulator, and a pickup operation is stopped to temporarily retract the manipulator when the sensor detects an abnormality of the operation during a pickup operation of an article by the manipulator, in order to detect the article again by a visual recognition device.

However, in the known technique described in Japanese Laid-open Patent Publication No. 2000-263481, the manipulator needs to retract every time an abnormality is detected. Therefore, the pickup operation may be terminated even if there is an article which can be actually picked up. For example, in order to avoid interference of the hand with an article in the surroundings or a container, a center of the open hand may be intentionally shifted from a center of an article. However, according to the technique disclosed in Japanese Laid-open Patent Publication No. 2000-263481, when the center of the hand is shifted from the center of the article, the abnormality is detected, and as a result, the pickup operation of the article is stopped. This means that even if there is an article which can be potentially picked up, the pickup process is stopped.

Therefore, an article pickup apparatus is needed which can stably pick up an article based on visual information acquired by a visual sensor.

SUMMARY OF THE INVENTION

According to a first aspect of the present invention, an article pickup apparatus is provided which is configured to detect randomly piled articles by a visual sensor and pick up the articles by a robot one by one based on visual information acquired by the visual sensor, wherein the robot comprises: a hand provided at a tip end of an arm and configured to hold the article; and a force sensor configured to detect an external force acting on the hand, wherein the article pickup apparatus comprises: a visual information processing unit configured to acquire a position and a posture of the hand in which the hand can hold the article, as a holding position and posture, based on visual information acquired by the visual sensor; a force target value setting unit configured to set a target value of an external force acting on the hand when the article is held; and a holding operation unit configured to control the robot to move the hand to the holding position and posture and control the hand to hold the article, and wherein the holding operation unit is configured to control the robot or the hand in accordance with profile, control when the article is held by the hand so that an external force detected by the force sensor is closer to the target value of the external force.

According to a second aspect of the present invention, in the article pickup apparatus according to the first aspect, the force sensor is configured to detect a reaction force acting on the hand as a result of contact between the hand and the article when the robot moves the hand to the holding position and posture, and wherein the holding operation unit is configured to stop the robot and control the hand to hold the article when the reaction force detected by the force sensor exceeds a predetermined first threshold value.

According to a third aspect of the present invention, in the article pickup apparatus according to the first aspect or the second aspect, the force sensor is configured to acquire the external force acting on the hand with respect to individual components of the respective coordinate axes of a hand coordinate system, a position and a posture of which are fixed relative to the hand, wherein the force target value setting unit is configured to set a target value of the external force with respect to individual components of the respective coordinate axes of the hand coordinate system, and wherein the holding operation unit is configured to control the robot or the hand in accordance with the profile control based on a target value of the external force set by the force target value setting unit.

According to a fourth aspect of the present invention, in the article pickup apparatus according to any one of the first to third aspects, the holding operation unit is configured to stop a holding operation of the article by the hand and control the hand to release the article from the hand, in the case where the external force detected by the force sensor exceeds a predetermined second threshold value when the hand holds the article.

According to a fifth aspect of the present invention, the article pickup apparatus according to any one of the first to fourth aspects, further includes a storage unit configured to store the external force detected by the force sensor and a number of the articles held by the hand in association with each other as first storage information; and an article number determination unit configured to determine the number of the articles held by the hand based on the external force detected by the force sensor when the hand picks up the article and the first storage information.

According to a sixth aspect of the present invention, the article pickup apparatus according to any one of the first to fourth aspects, further includes a storage unit configured to store the external force detected by the force sensor and a type of the article held by the hand in association with each other as second storage information when the randomly piled articles include different types of articles; and an article type determination unit configured to determine a type of the article held by the hand based on the external force detected by the force sensor when the hand picks up the article and the second storage information.

According to a seventh aspect of the present invention, in the article pickup apparatus according to any one of the first to sixth aspects, the hand is a chuck hand for holding the article by opening or closing, and wherein the holding operation unit is configured to control an opening and closing amount of the hand to execute a holding operation of the article by the hand and control the robot or the hand in accordance with profile control so that an external force detected by the force sensor is closer to a target value of the external force when the hand comes into contact with the article by opening or closing the hand.

These and other objects, features and advantages of the present invention will become more apparent in light of the detailed description of exemplary embodiments thereof as illustrated in the drawings.

BRIEF DESCRIPTION OF THE DRAWINGS

FIG. 8 is a functional block diagram of an article pickup apparatus according to another embodiment.

FIG. 9 is a graph illustrating relationships between the number of articles being held and a detected external force.

DETAILED DESCRIPTION OF THE INVENTION

Figure 1:
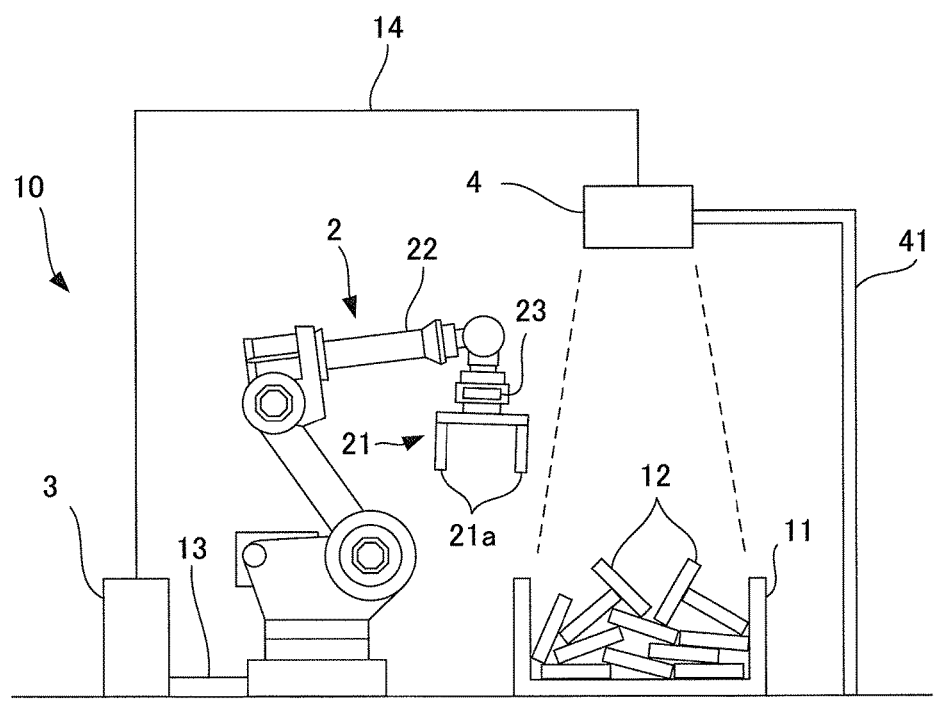
FIG. 1 is a schematic drawing illustrating an article pickup apparatus according to one embodiment of the present invention.

Embodiments of the present invention will be described in detail below with reference to the attached drawings. Scales of illustrated components have been changed as necessary to facilitate understanding of the present invention. Same or corresponding components are denoted by the same reference numerals.

FIG. 1 is a schematic drawing illustrating an article pickup apparatus 10 according to one embodiment of the present invention. The article pickup apparatus 10 includes a robot 2 having a hand 21 at a tip end of an arm 22, a robot control apparatus (also simply referred to as "the control apparatus") 3 which is connected to the robot 2 via a communication cable 13 and transmits a control signal for controlling the robot 2, and a visual sensor 4 which is fixed to a stand 41 and detects articles 12 randomly piled in a container 11. The article pickup apparatus 10 is used to pick up articles 12 by the robot 2 one by one based on visual information acquired by the visual sensor 4.

The robot 2 is, for example, a six-axis vertical articulated robot as illustrated in FIG. 1. However, the robot 2 may include any other configuration. The hand 21 is, for example, a chuck hand designed to hold and release an article 12 by controlling opening and closing amounts of a pair of claws 21a disposed to face each other. The claws 21a are driven by a given power source, such as an electric motor or a hydraulic actuator. The hand 21 may be other types of hand designed to hold an article 12, such as a suction nozzle, an attractive magnet, and a suction pad.

A force sensor 23 is installed between the robot 2 and the hand 21. The force sensor 23 is used to detect an external force acting on the hand 21. Information of the external force detected by the force sensor 23 is transmitted to the control apparatus 3 via a communication means, such as a communication cable, which is not illustrated.

The force sensor 23 is, for example, a six-axis force sensor which can acquire information of six axes. Alternatively, the force sensor 23 may be a three-axis force sensor which can acquire information of three axes. A method for measuring an external force acting on the hand 21 using a three-axis force sensor is described, for example, in Japanese Laid-open Patent Publication No. 2012-137421.

The container 11 storing the articles 12 has a box shape with an open top so as to allow the robot 2 to access the inside of the container 11. The articles 12 are randomly disposed in the container 11. According to the embodiment illustrated in FIG. 1, the same type of the articles 12 are disposed in the container 11. However, the article pickup apparatus 10 may be configured to pick up a plurality of types of articles having different sizes or shapes.

The visual sensor 4 fixed above the container 11 is, for example, arranged so that an image capturing range substantially entirely includes a storage space of the container 11 for the articles 12. The visual sensor 4 is, for example, a two-dimensional camera or various three-dimensional measurement devices. An exemplary three-dimensional measurement device adopts a stereo system using two cameras. An alternative three-dimensional measurement device may adopt a method for scanning randomly piled articles 12 by laser slit beam, a method for projecting patterned light on the articles 12 using a projector or the like, a method for measuring a flight time of light emitted from a projector until the light is reflected on a surface of the article 12 and then enters into a photodetector, and the like. According to another embodiment which is not illustrated, the visual sensor 4 may be provided at the tip end of the arm 22 of the robot 2 together with the hand 21.

The visual information acquired by the visual sensor 4 is transmitted to the control apparatus 3 via a given communication means, such as a communication cable 14. In another embodiment, an additional control apparatus for processing the visual information acquired by the visual sensor 4 may be provided separately from the control apparatus 3 for controlling the robot 2.

The control apparatus 3 is a digital computer including a hardware configuration, such as a central processing unit (CPU), a read-only memory (ROM), and a random access memory (RAM). The control apparatus 3 further includes an interface for transmitting and receiving signals or data to and from an input device, such as a keyboard and a mouse, and a display means, such as a liquid crystal display.

Figure 2:
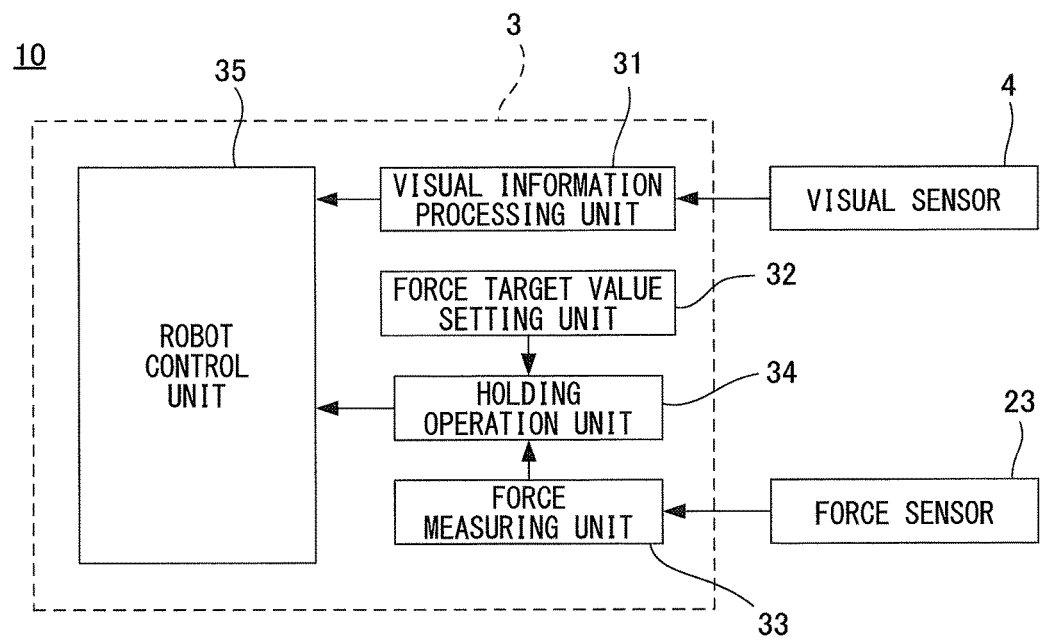
FIG. 2 is a functional block diagram of the article pickup apparatus according to one embodiment.

FIG. 2 is a functional block diagram of the article pickup apparatus 10. The control apparatus 3 of the article pickup apparatus 10 includes a visual information processing unit 31, a force target value setting unit 32, a force measuring unit 33, a holding operation unit 34, and a robot control unit 35 as illustrated in FIG. 2.

The visual information processing unit 31 calculates a position and a posture of the hand 21 in which the hand 21 can hold the article 12 (hereinafter also referred to as "the holding position and posture") based on the visual information acquired by the visual sensor 4. For example, the visual information processing unit 31 may be configured to compare a model of the article 12 stored in advance with the visual information and identify a position and a posture of the article 12 to calculate the position and the posture of the hand 21 relative to the identified position and posture of the article 12. Alternatively, the visual information processing unit 31 may be configured to directly calculate the position and the posture of the hand 21 in which the hand 21 can hold the article 12, without identifying the position and the posture of the article 12. The holding position and posture calculated by the visual information processing unit 31 is input to the robot control unit 35.

The force measuring unit 33 measures an external force acting on the hand 21 in cooperation with the force sensor 23. The external force acting on the hand 21 is calculated by subtracting a force applied to the force sensor 23 due to the hand 21 from a force measured by the force sensor 23. The force applied to the force sensor 23 due to the hand 21 can be calculated based on mass property of the hand 21 which is stored in advance.

The force target value setting unit 32 sets a force target value and related control parameters used in profile control which is executed simultaneously with the process in which the hand 21 holds the article 12. The force target value and the control parameters are set by, for example, an operator using the input device connected to the control apparatus 3.

The holding operation unit 34 generates a control signal necessary for the hand 21 to hold the article 12. For example, the holding operation unit 34 transmits a signal to the robot control unit 35 to open or close the claws 21a of the hand 21, so that the article 12 is released or held. In addition, the holding operation unit 34 according to the present embodiment is configured to control the robot 2 or the hand 21 to execute the profile control, which will be described below.

The robot control unit 35 operates the robot according to a predetermined program or detected information. For example, the robot control unit 35 moves the hand 21 to the holding position and posture calculated by the visual information processing unit 31. Further, the robot control unit 35 controls the robot 2 and the hand 21 to execute a holding operation of the article 12 according to a signal input from the holding operation unit 34.

The article pickup apparatus 10 according to the present embodiment controls the robot 2 or the hand 21 to execute the profile control when the holding operation of the article 12 is executed, so that the external force measured by the force measuring unit 33 is closer to the force target value set by the force target value setting unit 32. Specifically, the article pickup apparatus 10 executes force control in accordance with the following characteristic equation (formula 1) to execute the profile control.

$$F = M\ddot{x} + D\dot{x} + K(x - x_d) \tag{formula 1}$$

M: virtual inertia coefficient, D: virtual viscosity coefficient, K: virtual elastic coefficient, F: force acting on the tip end of the arm, x: a current position of a tip end of the hand, and $x_d$: a position of the tip end of the hand before a holding operation In other words, the position of the tip end of the hand 21 is controlled by operating the robot 2 or the hand 21 to satisfy the characteristic equation of formula 1, and thus the profile control is executed.

Figure 4A:
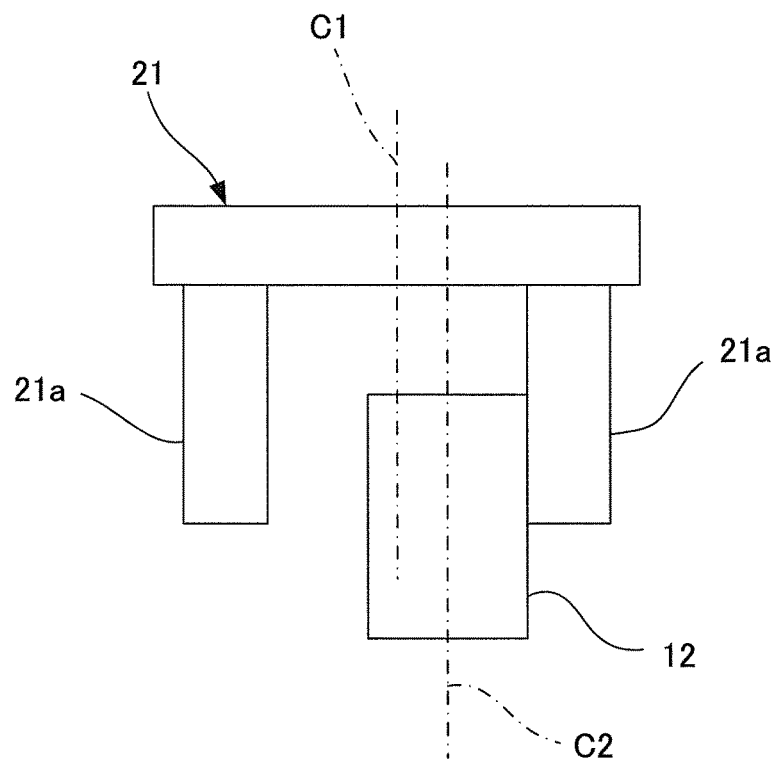
FIG. 4A illustrates profile control.
Figure 4B:
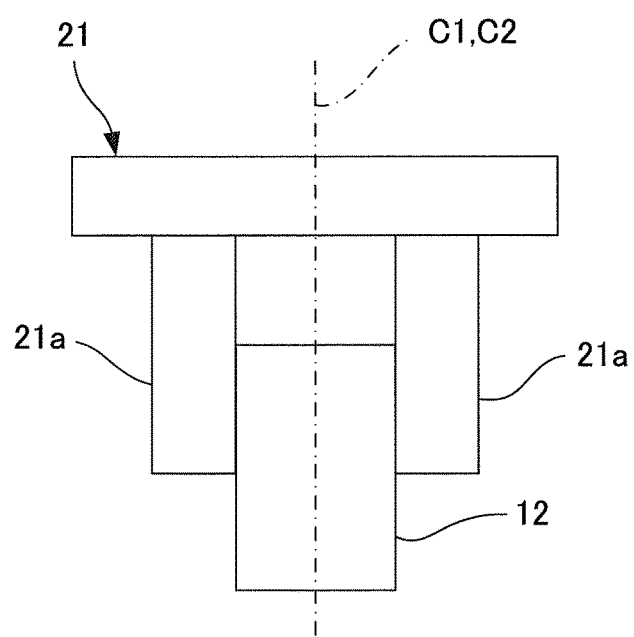
FIG. 4B illustrates profile control.

FIG. 4A and FIG. 4B illustrate behavior of the hand 21 performing the profile control according to the present embodiment. The illustrated hand 21 is a type of hand to pinch the article 12 by the claws 21a. FIG. 4A illustrates the hand 21 in the holding position and posture acquired from the visual information. In this state, a center axis line C1 of the hand 21 is shifted from a center axis line C2 of the article 12. If the hand 21 is lifted in this state, the article 12 cannot be picked up from the container 11. In addition, if the claws 21a are simply closed, a force acts on only the claw 21a on a right side contacting the article 12, and the robot 2 or the hand 21 may be subjected to overload. Generally, a chuck hand opens and closes claws by moving a pair of claws in opposite directions, so that the above-described situation may occur.

In contrast, the article pickup apparatus 10 according to the present embodiment executes the profile control when executing the holding operation. Therefore, as illustrated in FIG. 4B, when the holding operation is executed, the hand 21 is moved to a direction in which the external force acts on the hand 21. In other words, the hand 21 is moved to match the center axis line C1 of the hand 21 with the center axis line C2 of the article 12. Thus, the article 12 is pinched by the pair of claws 21a without a gap therebetween, and thus a stable holding state can be realized. In addition, since the robot 2 and the hand 21 are operated while executing the profile control, the robot 2 and the hand 21 can be prevented from being subjected to overload.

Figure 5A:
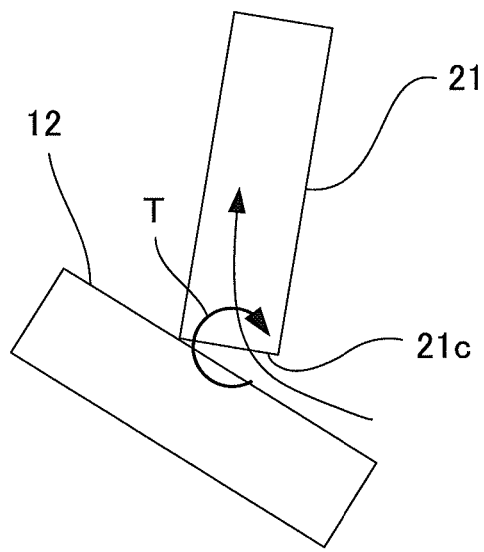
FIG. 5A illustrates profile control.
Figure 5B:
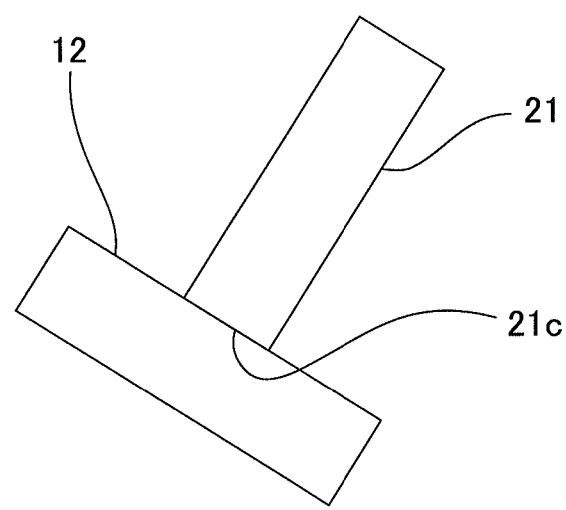
FIG. 5B illustrates profile control.

An exemplary configuration in which the hand 21 is a suction hand is illustrated in FIG. 5A and FIG. 5B. In the holding position and posture illustrated in FIG. 5A, there is a gap between a suction portion 21c of the hand 21 and the article 12. Thus, a sufficient suction power is not generated, and the hand 21 may fail to hold the article 12. When the suction portion 21c sucks air as the holding operation in this state, torque T acts on the hand 21 as illustrated in FIG. 5A.

If the robot 2 or the hand 21 is operated in accordance with the profile control while the torque T is acting, the posture of the hand 21 is changed so as to eliminate the gap between the suction portion 21c of the hand 21 and the article 12 (the state shown in FIG. 5B). Accordingly, the article 12 can be stably held by the hand 21.

Further, the article pickup apparatus 10 according to the present embodiment executes the force control for the profile control so that a force detected by the force measuring unit 33 is closer to the force target value set by the force target value setting unit 32. The force target value may be set, for example, with respect to individual components of the respective coordinate axes of a hand coordinate system. The hand coordinate system is a coordinate system whose position and posture are fixed with respect to the hand 21. In this case, the force measuring unit 33 is configured to measure the external force acting on the hand 21 with respect to individual components of the respective coordinate axes of the hand coordinate system.

Generally, the force control expressed by a following characteristic equation (formula 2) is executed for the profile control so that the external force acting on the hand 21 is closer to the force target value.

$$F - F_d = M\ddot{x} + D\dot{x} + K(x - x_d) \qquad \text{(formula 2)}$$

$F_d$: a predetermined target value of the external force acting on the hand

Figure 6A:
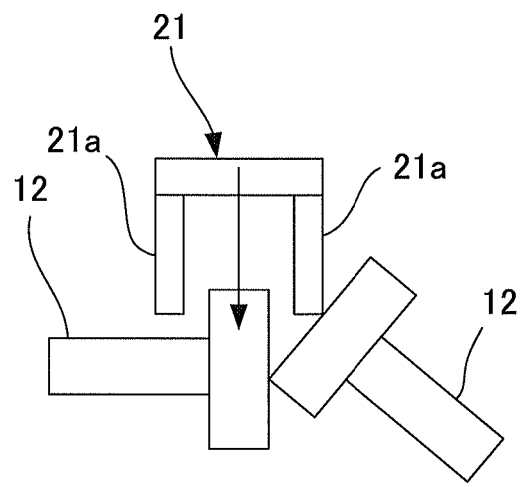
FIG. 6A illustrates profile control.

FIG. 6A illustrates the hand 21 in the holding position and posture. When the claws 21a of the hand 21 in the holding position and posture shown in FIG. 6A are closed, the article 12 is held only by the tip ends of the claws 21a. Thus, a contact area between the claws 21a and the article 12 is too small to stably hold the article 12.

Figure 6B:
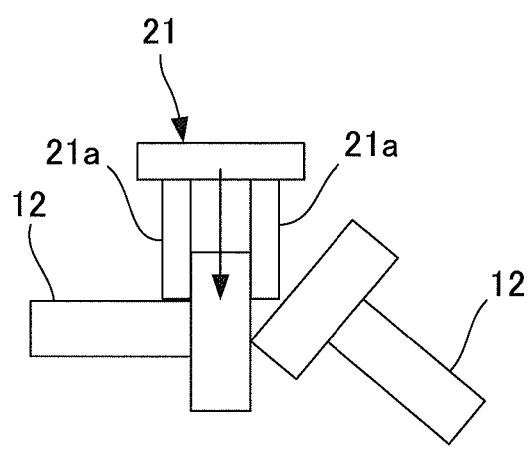
FIG. 6B illustrates profile control.

Therefore, according to the present embodiment, a force target value in a Z-axis direction of the hand coordinate system (a direction of an arrow in FIG. 6A) is set to a small value (for example, −1N). In this case, the claws 21a are closed in accordance with the profile control during the holding operation, while the hand 21 moves along a surface of the article 12 (a direction of an arrow in FIG. 6B). As a result, the contact area between the claws 21a and the article 12 increases, and the article 12 can be stably held.

A holding operation is not always stably executed by the profile control in which the force target value is adjusted. For example, the profile control will be delayed with respect to an external force acting on the hand 21 due to a term including the virtual viscosity coefficient in the formula 1 and the formula 2. The term of virtual viscosity coefficient is effective in making the profile control robust. However, the profiled control may be delayed in some cases, possibly resulting in an excess external force acting on the hand 21. In order to prevent occurrence of an excess external force, the holding operation unit 34 may be configured to stop the holding operation when the external force measured by the force measuring unit 33 exceeds a predetermined threshold value in the profile control (namely, during the holding operation). In this case, the holding operation unit 34 stops the holding operation and controls the hand 21 to release the article 12. Accordingly, the robot 2 and the hand 21 can be prevented from being subjected to overload, and also the article 12 can be prevented from being damaged.

Figure 3:
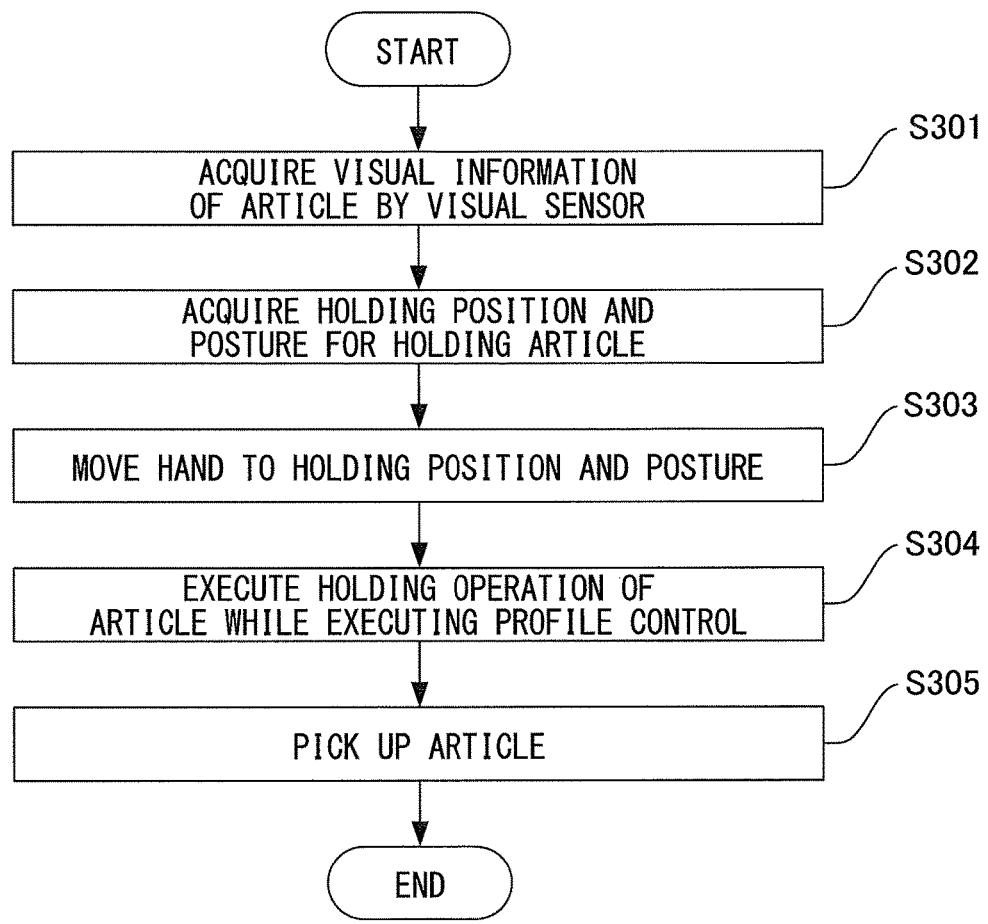
FIG. 3 is a flowchart illustrating a series of processes executed by the article pickup apparatus according to one embodiment.

FIG. 3 is a flowchart illustrating a series of processes executed by the article pickup apparatus 10. First, in step S301, in order to detect a loaded state of the articles 12, visual information of the articles 12 in the container 11 is acquired using the visual sensor 4. If the visual sensor 4 is a two-dimensional camera, an image of the articles 12 is captured. If the visual sensor 4 is a three-dimensional measurement device, a distance image of the articles 12 is acquired.

In step S302, the visual information processing unit 31 calculates the holding position and posture of the hand 21 based on the visual information acquired in step S301. In step S303, the robot control unit 35 controls the robot 2 to move the hand 21 to the holding position and posture.

In an approach operation executed in step S303, the holding position and posture may be updated based on a reaction force acting on the hand 21 by the article 12 in contact therewith. The reaction force acting on the hand 21 is calculated from the external force measured by the force measuring unit 33. In other words, when the robot 2 moves the hand 21 to the holding position and posture, and the force acting on the hand 21 exceeds a predetermined threshold value, it is determined that the hand 21 comes into contact with the article 12. When it is determined that the hand 21 comes into contact with the article 12, the approach operation of the robot 2 is terminated.

Figure 7A:
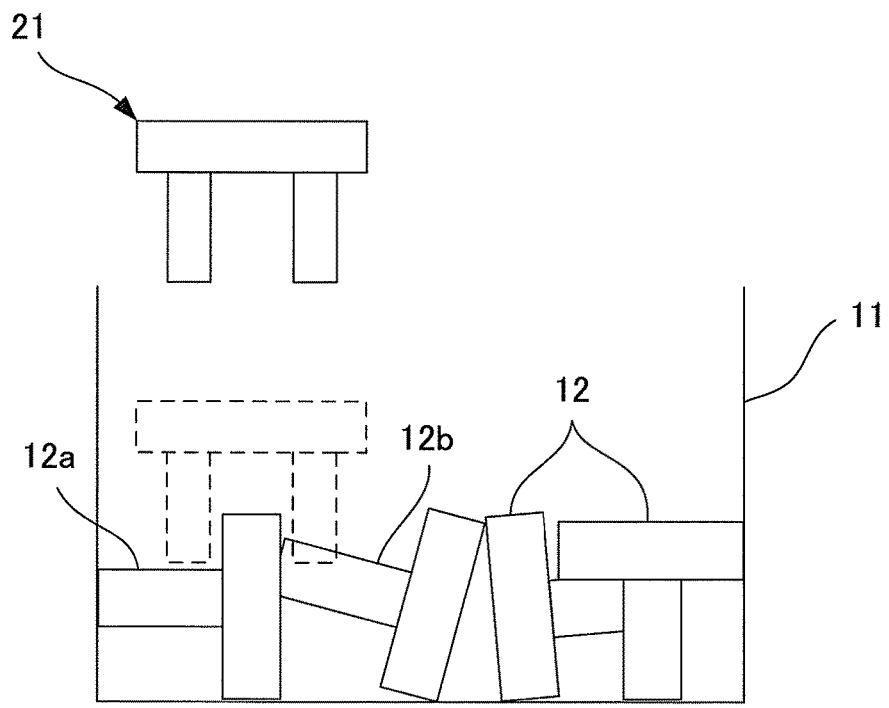
FIG. 7A illustrates update processing of a holding position and posture.

FIG. 7A illustrates the holding position and posture of the hand 21 calculated by the visual information processing unit 31. When the hand 21 is to be moved to the holding position and posture indicated by a dashed line in order to pick up an article 12a, the hand 21 interferes with another article 12b placed in the periphery of the article 12a. In such a case, it is determined that the hand 21 cannot hold the article 12, and an article pickup process may be stopped.

Figure 7B:
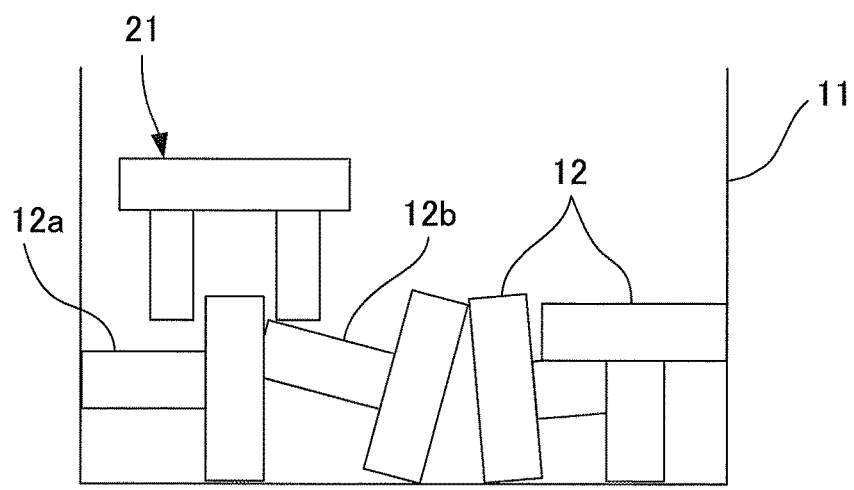
FIG. 7B illustrates update processing of a holding position and posture.

In order to prevent the above, the external force acting on the hand 21 is monitored, and the approach operation is executed by replacing the holding position and posture with a position where the hand 21 comes into contact with the article 12b to update a holding position and posture, as illustrated in FIG. 7B. In this case, the article 12a is held at a position above the holding position and posture calculated based on the visual information, and thus the holding operation can be executed.

Referring to FIG. 3 again, in step S304, the holding operation unit 34 executes the holding operation of the article 12 by the robot 2 and the hand 21. During the operation, the robot 2 or the hand 21 is operated in accordance with the profile control as expressed in the formula 1 or the formula 2 described above.

In step S305, the robot 2 is operated to move the hand 21 holding the article 12, and the article 12 is picked up from the container 11. The article picked up by the robot 2 is placed at a predetermined site (for example, on a conveyor) by further operating the robot 2. According to the flowchart illustrated in FIG. 3, the article pickup apparatus 10 acquires the visual information of the articles 12 every time an article 12 is to be picked up. However, the holding positions and postures may be calculated for more than one article 12, respectively, based on the acquired visual information. In this case, the process does not return to step S301 after one article 12 is picked up, but returns to step S303 so that the article pickup apparatus 10 continuously picks up a next article 12.

According to the above-described article pickup apparatus 10, following advantageous effects can be achieved.

(1) The robot 2 or the hand 21 is controlled in accordance with the profile control when the article 12 is held. Accordingly, the article 12 can be stably held even if the article 12 cannot be held in the holding position and posture calculated from the visual information.

(2) The position where the hand 21 comes into contact with the article 12 is detected by measuring, by the force measuring unit 33, a reaction force acting on the hand 21 when the hand 21 comes into contact with the article 12. The detected contact position is used as the holding position and posture of the hand 21. Accordingly, a pickup process of the article 12 can be continued even when the article 12 cannot be held in the holding position and posture calculated from the visual information.

(3) The holding operation of the article 12 is stopped when the external force measured by the force measuring unit 33 exceeds a predetermined threshold value. Accordingly, the robot 2 and the hand 21 can be prevented from being subjected to overload, and also the article 12 can be prevented from being damaged.

FIG. 8 is a functional block diagram of an article pickup apparatus 10 according to another embodiment. According to the present embodiment, the control apparatus 3 further includes a storage unit 36 and an article number determination unit 37 in addition to the configuration described above with reference to FIG. 2.

The article pickup apparatus 10 is intended to pick up the articles 12 one by one from the container 11. However, the article pickup apparatus 10 may sometimes hold two or more articles 12 at the same time. By contrast, the article pickup apparatus 10 may sometimes fail to hold the article 12. According to the present embodiment, it is determined whether or not the holding operation is properly executed based on a detected value of the external force measured by the force measuring unit 33.

Due to an inertia force acting on the hand 21, which depends on acceleration/deceleration, it is difficult to accurately measure mass of the article 12 held by the hand 21 in motion. The mass of the article 12 can be measured if the robot 2 is stopped; however, it is not desirable because this results in increased cycle time.

FIG. 9 is a graph illustrating an external force detected, depending on the number of the articles 12 simultaneously held by the hand 21. In FIG. 9, an abscissa axis indicates elapsed time, and an ordinate axis indicates the external force measured by the force measuring unit 33. In FIG. 9, a solid line represents data of the external force acting on the hand 21 when one article 12 is held, a dashed line represents data of the external force acting on the hand 21 when two articles 12 are held, and a dotted line represents data of the external force acting on the hand 21 when no article 12 is held.

As illustrated in FIG. 9, the data of the external force obtained when the robot 2 is in motion includes relatively large noise. Thus, the number of the articles 12 is determined based on, for example, average values M0 to M2 during a measuring period from t1 to t2. Specifically, when the external force acting on the hand 21 is within a range based on the average value M0, which is indicated by a double-headed arrow A0, it is assumed that the hand 21 fails to hold an article 12. When the external force is within a range based on the average value M1, which is indicated by a double-headed arrow A1, it is assumed that the hand 21 holds one article 12. When the external force is within a range based on the average value M2, which is indicated by an arrow A2, it is assumed that the hand 21 holds two or more articles 12.

The storage unit 36 stores data indicative of a relationship between the number of the articles 12 held by the hand 21 and the external force acting on the hand 21 as described above with reference to FIG. 9.

The article number determination unit 37 determines the number of the articles 12 held by the hand 21 based on the external force measured by the force measuring unit 33 with reference to the data stored in the storage unit 36.

According to the present embodiment, it can be determined whether or not the article 12 is accurately held one by one, when the robot 2 is in motion. Thus, the number of the articles 12 held by the hand 21 can be determined without increasing the cycle time. In the case where the article number determination unit 37 determines that two or more articles 12 are held simultaneously, the robot 2 may be controlled to shake off the article 12 or to hold an article 12 again. If it is determined that no article 12 is held, the operation for holding an article 12 is executed again. Thus, the article 12 can be stably picked up.

Figure 10:
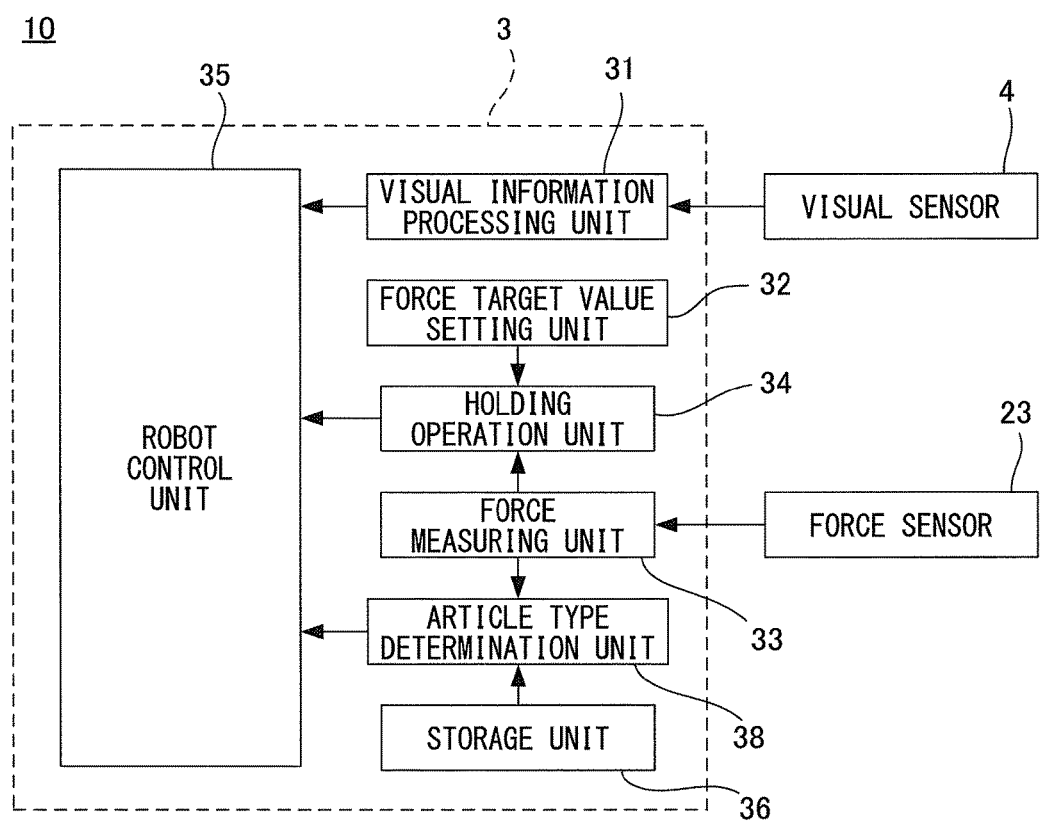
FIG. 10 is a functional block diagram of an article pickup apparatus according to yet another embodiment.

FIG. 10 is a functional block diagram of an article pickup apparatus 10 according to yet another embodiment. According to the present embodiment, the control apparatus 3 further includes a storage unit 36 and an article type determination unit 38, in addition to the configuration described above with reference to FIG. 2:

According to the present embodiment, the article pickup apparatus 10 is configured to determine the type of the article 12, instead of the number of the articles 12, based on a measured result of the force measuring unit 33. Therefore, in this case, the storage unit 36 stores data indicative of a relationship of the type of the article 12 held by the hand 21 and the external force acting on the hand 21. The article type determination unit 38 determines the type of the article 12 held by the hand 21 with reference to the data stored in the storage unit 36.

Effect of the Invention

According to the present invention, the robot or the hand is controlled in accordance with the profile control based on a detected value of the force sensor during a process for holding an article by the hand. Accordingly, occurrence of overload on the hand or the robot and failure in holding the article can be prevented, and the article can be stably picked up.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. An article pickup apparatus configured to detect randomly piled articles by a visual sensor and pick up the articles by a robot one by one based on visual information acquired by the visual sensor, the article pickup apparatus comprising:
   a robot including:
      a hand provided at a tip end of an arm and configured to hold an article,
      a force sensor configured to detect a force acting on the hand with respect to individual components of the respective coordinate axes of a hand coordinate system, a position and posture of which are fixed relative to the hand;
   a robot controller including:
      a visual information processing unit configured to acquire a position and a posture of the hand in which the hand can hold the article, as a holding position and posture, based on visual information acquired by the visual sensor;
a force target value setting unit configured to set a target value of an external force acting on the hand with respect to individual components of the respective coordinate axes of the hand coordinate system when the article is held; and
a holding operation unit configured to control the robot to move the hand to the holding position and posture and control the hand to hold the article,
wherein the holding operation unit is configured to execute a profile control, the profile control including controlling the robot or the hand so that an external force detected by the force sensor becomes closer to the target value of the external force set by the force target value setting unit.

2. The article pickup apparatus according to claim 1, wherein the force sensor is configured to detect a reaction force acting on the hand as a result of contact between the hand and the article when the robot moves the hand to the holding position and posture, and
wherein the holding operation unit is configured to control the robot hand to stop holding the article when the reaction force detected by the force sensor exceeds a predetermined threshold value.

3. The article pickup apparatus according to claim 1, wherein the holding operation unit is configured to stop a holding operation of the article by the hand and control the hand to release the article from the hand, in the case where the external force detected by the force sensor exceeds a predetermined threshold value when the hand holds the article.

4. The article pickup apparatus according to claim 1, further comprising:

a storage unit configured to store the external force detected by the force sensor and a number of the articles held by the hand in association with each other as first storage information; and
an article number determination unit configured to determine the number of the articles held by the hand based on the external force detected by the force sensor when the hand picks up the article and the first storage information.

5. The article pickup apparatus according to claim 1, further comprising:
a storage unit configured to store the external force detected by the force sensor and a type of the article held by the hand in association with each other as second storage information when the randomly piled articles include different types of articles; and
an article type determination unit configured to determine a type of the article held by the hand based on the external force detected by the force sensor when the hand picks up the article and the second storage information.

6. The article pickup apparatus according to claim 1, wherein the hand is a chuck hand for holding the article by opening or closing, and
wherein the holding operation unit is configured to control an opening and closing amount of the hand to execute a holding operation of the article by the hand and control the robot or the hand in accordance with profile control so that an external force detected by the force sensor is closer to a target value of the external force when the hand comes into contact with the article by opening or closing the hand.

* * * * *